United States Patent [19]

Csontos

[11] 3,775,276

[45] Nov. 27, 1973

[54] PREPARATION OF LIQUID BROMINE-TERMINATED POLYMERS USING RADIATION AND A DIBROMO DICHLORO ALKANE

[75] Inventor: Alan A. Csontos, Norton, Ohio

[73] Assignee: The B. F. Goodrich Company, New York, N.Y.

[22] Filed: Jan. 12, 1973

[21] Appl. No.: 323,208

Related U.S. Application Data

[62] Division of Ser. No. 155,325, June 21, 1971, Pat. No. 3,730,862.

[52] U.S. Cl...... 204/163 R, 204/159.23, 204/162 R
[51] Int. Cl............................................... B01j 1/10
[58] Field of Search.................. 204/159.23, 162 R, 204/162, 163 R

[56] References Cited
UNITED STATES PATENTS 3,730,862    5/1973    Csontos........................... 204/163 R Primary Examiner—Murray Tillman
Assistant Examiner—Richard B. Turer
Attorney—J. Hughes Powell, Jr.

[57] ABSTRACT

Liquid bromine-terminated polymers are directly prepared as by polymerizing one or more acrylates, acrylates in combination with isoprene, or butadiene with acrylonitrile using a combination of ultra-violet light and a dibromo-dichloro alkane containing at least two carbon atoms only as the polymerization initiator. These polymers are vulcanized with polyfunctional amines as curing agents to form solid elastomers, and are useful as base polymers for caulks, sealants, potting compounds, and like formulations.

4 Claims, No Drawings

PREPARATION OF LIQUID BROMINE-TERMINATED POLYMERS USING RADIATION AND A DIBROMO DICHLORO ALKANE

This is a division of application Ser. No. 155,325 filed June 21, 1971, now U.S. Pat. No. 3,730,852.

BACKGROUND OF THE INVENTION

Liquid halogen-terminated polymers that can be cured to an elastomeric solid are desirable base polymers for caulks, sealants, potting compounds, and like formulations. To obtain maximum extensibility in the vulcanized state, the halogen cure sites on the liquid polymer will be located at the terminal ends of the polymer molecule. At times, to obtain faster and/or tighter cures, it is desirable to have additional cure sites along the polymer backbone.

Such polymers are not readily prepared directly by free-radical polymerication because often the halide compounds used as chain transfer agents will preferentially undergo 1:1 addition to the vinylidene monomers during polymerization resulting in 1:1 adducts and some dimer and trimer products. Formation of higher molecular weight products is small or nil. The formation of such adducts is especially troublesome in free-radical polymerizations employing a combination of ultra-violet light and an organic halide as the initiator system.

Buckler et al in U.S. Pat. No. 3,506,742 discloses a process for the preparation of liquid halogen-terminated conjugated diolefin polymers comprising (a) first preparing a halide compound of the structure $X(Y)Z$ where X is a halide; Z is $-CBr_3$, $-CCl_3$, $-Cl_3$, or $$>Cl_2;$$

and Y is a radical of the structure selected from the group consisting of

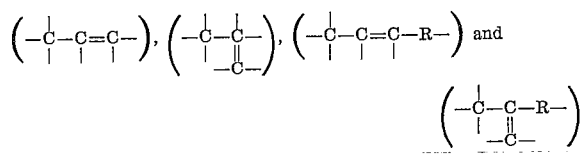

where R is a hydrocarbon radical or substituted hydrocarbon radical, by reacting a $C_4$–$C_8$ diolefinic hydrocarbon with a tri- or tetra- halogen-substituted methane, said reaction being carried out in an emulsion using an oil-soluble free-radical generating compound as the reaction initiator; and (b) using the $X(Y)Z$ halide compound as a modifier in the polymerization of $C_4$–$C_8$ diolefinic hydrocarbons, said polymerization again being carried out in an emulsion using redox compositions or free-radical generating compounds as the polymerization initiator. The process then is a complex two-step process, both steps being carried out in an emulsion. The $X(Y)Z$ halide compound is described as being an oily product, the examples showing it to be of a high bromine content (over 40% by weight) and a molecular weight of from about 400 to about 800.

SUMMARY OF THE INVENTION

It has now been discovered that liquid bromine-terminated and bromine-containing polymers of at least one acrylate monomer, of alkylates in combination with isoprene, butadiene, or acrylonitrile, and of butadiene or isoprene with acrylonitrile can be directly prepared in one step by polymerizing together the monomers using a combination of ultra-violet light and a dibromo-dichloroalkane containing at least two carbon atoms only as the polymerization initiator. The reaction is conveniently carried out using a bulk or a solution process technique.

DETAILED DESCRIPTION

The acrylates used have the general formula

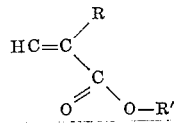

where R is $-H$, $-CH_3$, or $-C_2H_5$, and R' is an alkyl group containing one to 18 carbon atoms or an ether group wherein the total number of carbon atoms does not exceed five. Typical acrylates are ethyl acrylate, n-butyl acrylate, isobutyl acrylate, n-hexyl acrylate, 2-methylhexyl acrylate, methyl methacrylate, n-butyl methacrylate, n-octyl methacrylate, n-octadecyl methacrylate, ethyl ethacrylate, methoxy ethyl acrylate, ethoxy propyl acrylate, and the like. Preferred acrylates are of the formula

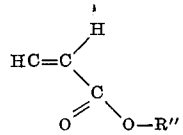

wherein R'' is an alkyl group containing one to 10 carbon atoms. The acrylates can be used singly, in combination with each other, or with butadiene, isoprene, or acrylonitrile monomers. A preferred polymer composition would exhibit a polymeric Tg value of below $-26°C$. Such compositions would be, but are not limited to, a homopolymer of normal butyl acrylate, a polymer of up to 87% of ethyl acrylate and a minimum of 13% by weight of n-butyl acrylate, a polymer of up to 93% by weight of ethyl acrylate and a minimum of 7% by weight of isoprene, and a polymer of up to 28% by weight of acrylonitrile and a minimum of 72% by weight of normal butyl acrylate, all based on the total weight of monomer in the polymer. Also included are the bromine-terminated liquid polymers of isoprene or butadiene and acrylonitrile. A preferred composition for these polymers would contain up to 50% by weight of acrylonitrile and a minimum of 50% by weight of butadiene based on the total weight of polymer.

The polymerization initiator used is a combination of a dibromo- dichloro alkane and ultra-violet (UV) light. The dibromo-dichloro alkane is of the structure $BrCCl_2-R-Br$ wherein R is a radical of the formula $C_xH_{2x}$ where $x = 1$ to 12. The arrangement of carbon atoms may be linear as in a $(-CH_2-)$ radical or may contain a secondary as

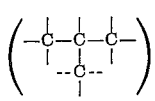

or a tertiary as

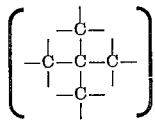

carbon structure. Typical dibromo-dichloro alkanes are 1,2-dibromo-1,1-dichloroethane; 1,6-dibromo-1,1-dichlorohexane; 1,4-dibromo-1,1-dichloro-3-methylbutane; 1,6-dibromo-1,1-dichloro-3,3,5-trimethyl-hexane; 1,5-dibromo-1,1-dichloro-4-propylpentane; and the like. Dibromo-dichloro alkanes containing two to six carbon atoms readily provide the desired polymers.

The dibromo-dichloro alkane is used in the range of from about 4 parts by weight to about 20 parts by weight per 100 parts by weight of monomer used. Another way to express the usage of the dibromo-dichloro alkane is to state the molar ratio of total moles of monomer to moles of dibromo-dichloro alkane used. The molar ratio used ranges from about 12 to 1 to about 120 to 1. A more preferred range is from about 15 to 1 to about 90 to 1.

Employing the broad molar range stated above and achieving a degree of polymerization such that the polymer molecule has a molecular weight above 1,000 yields a liquid polymer containing from about 0.5% to about 16% by weight of bromine based upon the total weight of the polymer. A more preferred range is from about 4% to about 14% by weight of bromine.

The ultra-violet (UV) light acts to sensitize the dibromo-dichloro alkane, causing it to split into free radicals consisting of or containing a bromine. The dibromo-dichloro alkane not split by the UV light may act as a chain transfer agent during the polymerization. The source of UV light can be any source emitting near UV light, especially in the 3000A to 4000A range.

The ultra-violet light must be allowed to penetrate to the dibromo-dichloro alkane. This is easily accomplished by placing the light source within a glass well in the reactor vessel, or by placing the light source external to the reactor vessel and transmitting the light through a glass wall or window into the reactor vessel. The type of glass used must be capable of transmitting near UV light. Types of glass and their transmission ranges are known to those who are skilled in the art.

The polymerization of the monomers as initiated by the combination of a dibromo-dichloro alkane and ultra-violet light can be conveniently carried out in a bulk or a solution polymerization. Typical suitable solvents are tertiary butyl alcohol, hexane, heptane, and the like.

The polymerization can be performed as a batch or a continuous process. Another process is to batch charge the dibromo-dichloro alkane and a solvent to the reactor vessel and then to add in increments of the monomer(s) into the reactor vessel while the solution is being irradiated. In the incremental addition process, the molar ratio of monomer to dibromodichloro alkane may be initially as low as 5 to 1. The molar ratio increases however due to the addition of monomer during the course of polymerization. The total molar ratio of monomer to initiator used then is within the molar ranges as defined above. The incremental addition process provides for better molecular weight control and higher conversion of monomer to polymer. In this sense, it is a preferred polymerization procedure.

Exemplary of the process of this invention is a process wherein the acrylate monomer is used in the range from about 83 percent to about 96 percent by weight based upon the total weight of monomer and dibromo-dichloroalkane charged, and the R of the dibromo-dichloro alkane is a radical of the structure $C_xH_{2x}$ where $x = 1$ to 5. More preferred, the monomers are ethyl acrylate used in the range from about 4 percent to about 88 percent by weight and an alkyl acrylate of the formula $H_2C=CH-CO-OR''$, where R'' is an alkyl group containing one to 10 carbon atoms, used in the range from about 8 percent to about 79 percent by weight, both weights based upon the total weight of monomers and dibromo-dichloro-alkane charged, and the molar ratio of monomer to dibromo-dichloroalkane used ranges from about 15:1 to about 60:1. Even more preferred, the monomers are ethyl acrylate used in a range from about 37 percent by weight to about 78 percent by weight and normal butyl acrylate used in the range from about 10 percent to about 46 percent by weight, the dibromo-dichloroalkane used is 1,2-dibromo-1,1-dichloroethane, and the prepared liquid polymer has a weight percent bromine content of from about 4 percent to about 14 percent by weight.

The temperatures during polymerization range from about 0°C. to about 85°C. A more preferred temperature range is from about 25°C. to about 60°C.

The reaction can be performed under pressure, vacuum, or at atmospheric conditions. It is desirable to exclude oxygen or air from the reactor vessel and the polymerization solution. This is easily done by purging the reactor vessel and the polymerization solution with nitrogen gas.

The liquid polymers can be recovered by placing the polymerization solutions under a vacuum and heating to distill off the unreacted monomers and solvent if used. The polymers can also be recovered by coagulation of the polymer solution using water, methyl alcohol, isopropyl alcohol, or a water/alcohol solution, followed by drying under a vacuum.

The liquid bromine-terminated polymers are characterized by having a bulk viscosity as measured at 27°C. with a Brookfield model LVT viscometer using spindle No. 7 at 1 to 50 rpm ranging from about 2,000 cps. to about 4,000,000 cps., and a number average molecular weight as measured with a Mechrolab Vapor Pressure Osmometer using ethyl acetate as the solvent ranging from about 1,000 to about 20,000. Polymers having bulk viscosities from about 5,000 cps. to about 600,000 cps. are especially suitable for certain applications.

The polymers are stable at application temperatures. Compound ingredients known to the liquid polymer art can be mixed with the polymers using ink mills, bulk mixing equipment such as Henschel mixers, and the like. Typical ingredients are fillers such as clays, silicas, $TiO_2$, asbestos, carbon black, and the like; pigments; plasticizers and lubricants; and stabilizers and antioxidants.

Cure agents for the bromine-terminated liquid polymers include primary, secondary, and tertiary polyfunctional amines. Cure time, the time from application until the liquid polymer vulcanizes to an elastomeric solid, varies as to the type of amine used and its level, and the temperature of vulcanization. Typical polyfunctional amines (amines containing two or more nitrogen atoms) are aliphatic amines such as triethylene tetraamine, methylated triethylene tetraamine, diethylenetriamine, pentamethylenediamine, and the like; heterocyclic amines such as piperazine, triethylenediamine, 4,4-dipicolyl-amine, and the like; and aromatic amines such as 2,4,6-tri(dimethylaminomethyl)-phenol, 4,4'-diaminodiphenyl, and the like; and mixtures thereof.

The following examples will further illustrate the invention. The amounts of ingredients used are in parts by weight unless otherwise indicated.

EXAMPLE I

Two liquid bromine-terminated acrylate polymers were prepared. The recipes are listed below.

|  | 1 | 2 |
|---|---|---|
| Ethyl acrylate | 70 | 70 |
| Normal butyl acrylate | 30 | 30 |
| 1,2-dibromo-1,1-dichloroethane | 9 | 16 |
| t-butyl alcohol | 20 | 20 |
| Irradiation time, hours | 8.0 | 7.5 |
| Temperature, °C. | 50 | 50 |
| Percent Conversion | 44 | 45 |

The polymers were prepared by a batch polymerization. The ethyl acrylate, the normal butyl acrylate, the 1,2-dibromo-1,1-dichloroethane, and the tertiary butyl alcohol were charged to a glass reactor vessel equipped for agitation. The vessel was then purged with nitrogen gas and sealed. An H100 A4/T Mercury lamp was placed about 2 inches from the glass reactor vessel. The solutions were agitated and irradiated for the times indicated. Percent conversion of monomer to polymer was measured by weight percent total solids of the polymer solution. The polymers were recovered by placing the solutions under a vacuum and heating to distill off the solvent and the unreacted monomers. Properties of the polymers are listed in the following table.

|  | 1 | 2 |
|---|---|---|
| Bulk viscosity, cps | 2,920,000 | 1,560,000 |
| Weight percent chlorine | 5.02 | 5.66 |
| Molecular weight | 17,000 | 11,400 |

Bulk viscosity was measured at 27°C. using a Brookfield model LVT viscometer with spindle No. 7 at 1 rpm. Weight percent bromine contents were about 11.6 percent by weight for sample 1 and about 12.7 percent by weight for sample 2, as the Br/Cl weight ratio in the initiator is 2.25.

The procedure of Example I was repeated using the following recipe:
  Ethyl acrylate: 80
  Isoprene: 20
  1,2-dibromo-1,1-dichloroethane: 6
  t-butyl alcohol: 20

The polymerization temperature was about 40°C. After 50 hours of irradiation, the polymerization was stopped and 10 percent conversion of monomers was measured. The polymer solution was a reddish-brown, thick liquid.

EXAMPLE II

A liquid bromine-terminated acrylate polymer of ethyl acrylate and normal butyl acrylate was prepared by an incremental addition process. The reactor vessel was a three-necked Pyrex flask equipped with a mechanical glass agitator. The UV light source was two (2) H100 A4/T Mercury lamps spaced about 2 inches from the flask at 180° from each other. A nitrogen gas purge was maintained over the solution prior to and during polymerization. The recipe used was:
  Ethyl acrylate: 70
  Normal butyl acrylate: 30
  1,2-dibromo-1,1-dichloroethane: 9
  t-butyl alcohol: 50

The 1,2-dibromo-1,1-dichloroethane and the tertiary butyl alcohol were charged to the Pyrex flask. The ethyl acrylate and the normal butyl acrylate were mixed and two-fifths of the total weight was added to the vessel. The initial molar ratio of monomer to initiator was about 10 to 1. The light sources were switched on the solution agitated. The remaining monomer solution was added incrementally according to a prearranged schedule. At 2.0 hours into the polymerization, one-third of the remaining three-fifths of the monomer solution was added. At 4.0 hours into the polymerization, another one-third of the remaining solution was added. At 4.0 hours, the final third of the remaining solution was added. The total molar ratio of monomer to initiator used was about 26 to 1.

The polymerization was stopped after 8.0 hours by switching off the light sources. Temperature of reaction throughout the run was 57° ± 3°C. Percent conversion of monomers to polymer was 77% as measured by weight percent total solids.

The polymer was recovered by placing the solution under a vacuum and heating to distill off the t-butyl alcohol and the unreacted acrylates. The liquid acrylate polymer had a bulk viscosity of 616,000 cps. at 27°C., a molecular weight of 11,600, and a weight percent chlorine content of 1.8 percent as measured by percent chlorine chemical analysis. The weight percent bromine content was about 4.1 percent by weight.

This example demonstrates that higher conversions, faster conversion rates, and lower molecular weights can be obtained using the incremental addition process instead of a batch process.

EXAMPLE III

A liquid bromine-terminated polymer of butadiene with acrylonitrile was prepared following the procedure of Example I. The recipe used was 80 parts of butadiene, 20 parts of acrylonitrile, 9 parts of 1,2-dibromo-1,1-dichloroethane, and 50 parts of tertiary butyl alcohol. The polymerization temperature was about 40°C. The solution was irradiated for 170 hours, and a 64 percent conversion of monomers was measured after this time. The polymer was recovered by drying down under a vacuum. The polymer had a bulk viscosity of 18,000 cps., a weight percent bromine content of 10.7 percent as measured by X-Ray Spectrochemical analysis, a V.P.O. molecular weight of 2,160, and a weight percent acrylonitrile content of 21.9 percent as measured using the Kjehdahl method for nitrogen analysis. The bromine content of the polymer and the molecular weight together indicate the presence of an average of 2.9 bromine atoms on each polymer molecule. The sample had a molecular weight to molecular number ratio (Mw/Mn) of about 3.0 as measured on a Gel Permeation Chromatograph using THF as a solvent.

EXAMPLE IV

The polymers prepared in Example III were cured using polyfunctional amines as vulcanizing agents. The compounds given below were cured at two different temperatures.

| | 1 | 2 | 3 |
|---|---|---|---|
| Liquid butadiene-acrylonitrile polymer | 100 | 100 | 100 |
| Triethylene tetraamine | 2.5 | 5.0 | 2.0 |
| 2,4,6-tri(dimethyl-amino-methyl)phenol | | | 0.5 |
| Cured 20 minutes at 150°C. | | | |
| Hardness, Durometer A | X | 22 | X |
| % elongation | 150 | 125 | 200 |
| Cured 7 days at room temperature | | | |
| Hardness, Durometer A | 13 | 23 | 18 |
| % elongation | 125 | 125 | 200 |

The polymers cured to a dry surface both at room temperature and at elevated temperatures. The use of a mixture of a primary amine and a tertiary amine as the cure system yielded cures of higher extensibility.

The above polymers, formulated with fillers as clays, silicas, and $TiO_2$ and with plasticizers as the commercially sold Aroclor 6062, Colorowax 40, and Benzoflex 9-88 and commercial oils as Mobisol 66, are useful caulks for filling cracks and crevices between stone, brick, and concrete; sealants for aluminum, steel, and concrete to glass junctions; and potting compounds in which electrical wires and components may be embedded to provide flexible support.

I claim:

1. A process for preparing liquid bromine-terminated polymers of at least one acrylate monomer or of acrylate monomer with a vinylidene monomer selected from the group consisting of butadiene, isoprene, and acrylonitrile, having a weight percent bromine content of from about 0.5 percent to about 16 percent based upon the weight of the polymer, comprising polymerizing together said monomers using a combination of ultra-violet light having a wavelength in a range of 3,000 A. to 4,000 A. and a dibromo-dichloro alkane of the formula $BrCl_2C-R-Br$ wherein R is a radical of the structure $C_xH_{2x}$ where $x = 1$ to 12 as the polymerization initiator, wherein the dibromo-dichloro alkane is used in a range from about 4 part to about 20 parts by weight per 100 parts by weight of monomer used and the molar ratio of monomer to dibromo-dichloro alkane used ranges from about 12:1 to about 120:1.

2. A process of claim 1 wherein said monomers are acrylates of the formula

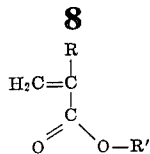

where R is —H, —$CH_3$, or —$C_2H_5$, and R′ is selected from the group consisting of an alkyl radical containing one to 18 carbon atoms and an ether radical wherein the total number of carbon atoms does not exceed 5, used in the range from about 83 percent to about 96 percent by weight based upon the total weight of monomer and dibromo-dichloro alkane charged, and the R of the dibromo-dichloro alkane is a radical of the structure $C_xH_{2x}$ where $x = 1$ to 5.

3. A process of claim 2 wherein said acrylate monomers are ethyl acrylate used in the range from about 4 percent to about 88 percent by weight and an alkyl acrylate of the formula

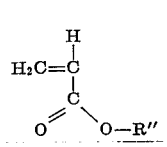

where R″ is an alkyl group containing one to 10 carbon atoms used in the range from about 8 percent to about 79 percent by weight, both based upon the total weight of monomers and dibromo-dichloro alkane charged, and the molar ratio of monomer to dibromo-dichloro alkane used ranges from about 15:1 to about 60:1.

4. A process of claim 3 wherein said acrylate monomers are ethyl acrylate used in the range from about 37 percent by weight to about 78 percent by weight and normal butyl acrylate used in the range from about 10 percent to about 46 percent by weight, and wherein the said prepared liquid polymer has a weight percent bromine content of from about 4 percent to about 14 percent by weight, and the dibromo-dichloro alkane used is 1,2-dibromo-1,1-dichloroethane.

* * * * *